US012174577B2

(12) United States Patent
Fujii

(10) Patent No.: US 12,174,577 B2
(45) Date of Patent: Dec. 24, 2024

(54) IMAGE FORMING APPARATUS

(71) Applicant: Hirofumi Fujii, Kanagawa (JP)

(72) Inventor: Hirofumi Fujii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/144,265

(22) Filed: May 8, 2023

(65) Prior Publication Data

US 2023/0367257 A1 Nov. 16, 2023

(30) Foreign Application Priority Data

May 10, 2022 (JP) ................................ 2022-077356

(51) Int. Cl.
*G03G 21/16* (2006.01)
*G03G 15/00* (2006.01)

(52) U.S. Cl.
CPC ......... *G03G 21/16* (2013.01); *G03G 15/5025* (2013.01); *G03G 2221/0068* (2013.01)

(58) Field of Classification Search
CPC ............ G03G 15/5058; G03G 15/161; G03G 15/1615; G03G 21/1647; G03G 2215/0436; G03G 21/1896
See application file for complete search history.

(56) References Cited

U.S. PATENT DOCUMENTS

2005/0163518 A1* 7/2005 Onose ................ G03G 15/5062 399/49
2012/0076527 A1* 3/2012 Goto .................. G03G 15/5058 399/301
2017/0315467 A1* 11/2017 Bryant ..................... B41J 2/442

FOREIGN PATENT DOCUMENTS

JP 11-161123 6/1999
JP 2006-208645 8/2006
JP 2013-174755 9/2013
WO WO-2020032929 A1 * 2/2020 ............ G01B 11/06

* cited by examiner

*Primary Examiner* — Jessica L Eley
(74) *Attorney, Agent, or Firm* — XSENSUS LLP

(57) ABSTRACT

An image forming apparatus includes an image forming device, an image bearer, at least one density sensor, a cleaning jig, and an insertion port. The image forming device forms a toner image. The image bearer bears the toner image to be transferred on a recording medium. The density sensor has a light-receiving surface to optically read the toner image. The light-receiving surface faces the image bearer constantly. The cleaning jig cleans the density sensor and includes a cleaner to contact the light-receiving surface. The cleaning jig is inserted through the insertion port into the body of the image forming apparatus and reciprocally moved to clean the light-receiving surface and is removed from the body of the image forming apparatus after the light-receiving surface is cleaned.

11 Claims, 4 Drawing Sheets

IMAGE FORMING APPARATUS

CROSS-REFERENCE TO RELATED APPLICATIONS

This patent application is based on and claims priority pursuant to 35 U.S.C. § 119(a) to Japanese Patent Application No. 2022-077356, filed on May 10, 2022, in the Japan Patent Office, the entire disclosure of which is hereby incorporated by reference herein.

BACKGROUND

Technical Field

Embodiments of the present disclosure relate to an image forming apparatus.

Related Art

As an image forming apparatus, for example, a copier, a printer, or a facsimile apparatus that employs an electrophotographic method is well known. In this type of image forming apparatus, the density characteristic of a print image is likely to vary depending on, for example, the use environment or changes of characteristics of developing cartridges or photoconductor drums. Accordingly, many color image forming apparatuses have an image density controller.

Such an image density controller generally forms patches of colors on an intermediate transfer belt, measures the densities of the patches with density sensors, and determines image forming conditions for obtaining a toner image having a desired density as image correction control.

However, when the density sensors are contaminated by, for example, toner in the image forming apparatus and the photosensitivity of the density sensors is deteriorated, a detection error of the density sensors may occur. For this reason, a technology is known in which a shutter as a shielding member for opening and closing an opening of a density sensor is disposed to protect the density sensor from contamination, for example, by toner.

SUMMARY

In an embodiment of the present disclosure, an image forming apparatus includes an image forming device, an image bearer, at least one density sensor, a cleaning jig, and an insertion port. The image forming device forms a toner image. The image bearer bears the toner image to be transferred on a recording medium. The density sensor has a light-receiving surface to optically read the toner image. The light-receiving surface faces the image bearer constantly. The cleaning jig cleans the density sensor and includes a cleaner to contact the light-receiving surface. The cleaning jig is inserted through the insertion port into the body of the image forming apparatus and reciprocally moved to clean the light-receiving surface and is removed from the body of the image forming apparatus after the light-receiving surface is cleaned.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
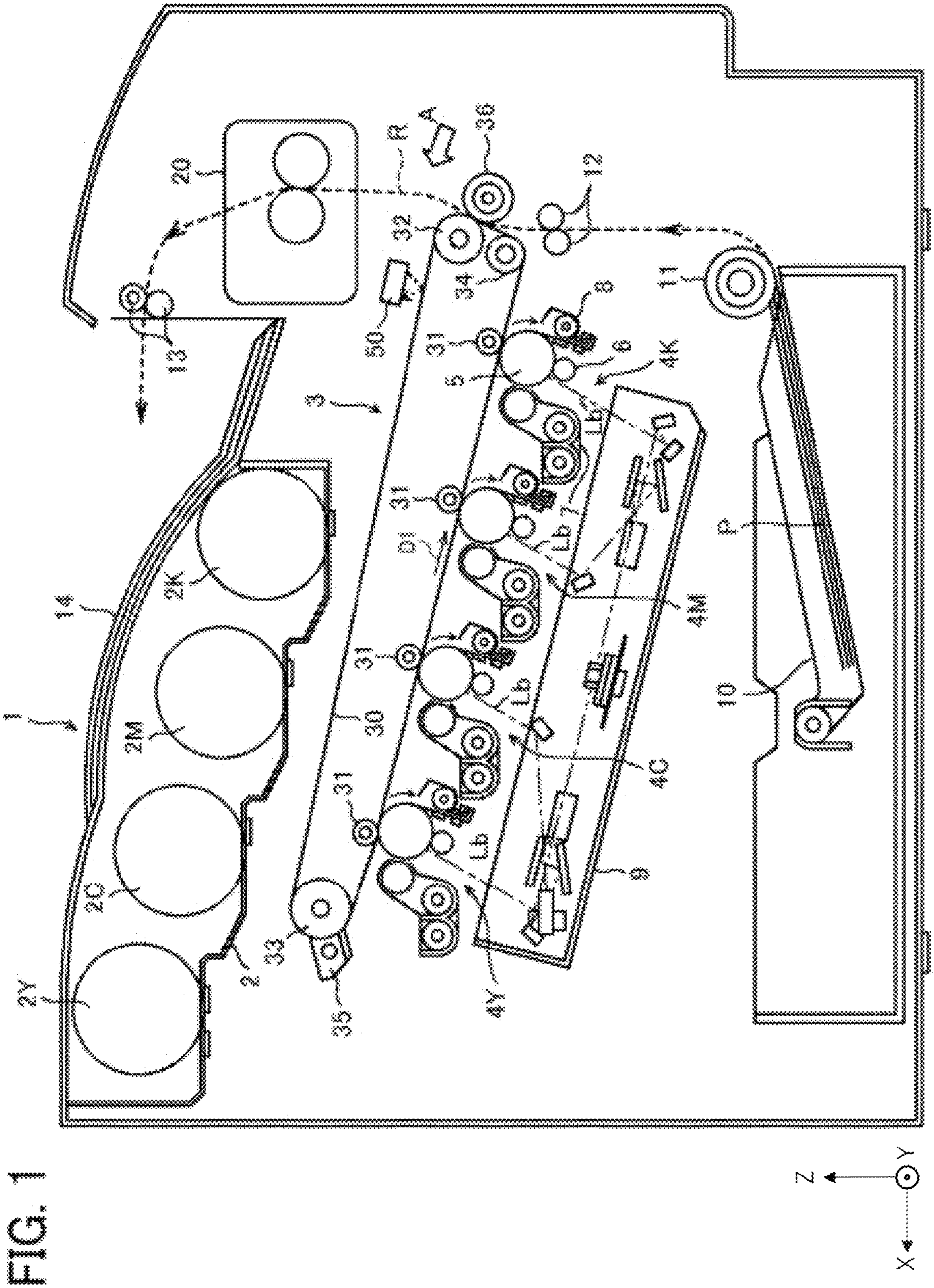
FIG. 1 is a schematic diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given of embodiments of the present disclosure with reference to the attached drawings.

FIG. 1 is a schematic diagram illustrating an overall configuration of an image forming apparatus 1 according to an embodiment of the present disclosure.

The image forming apparatus 1 is a color laser printer, and four image forming devices 4Y, 4C, 4M, and 4K that serve as image forming devices are arranged side by side in a center portion of a body of the image forming, apparatus 1 in a direction in which an intermediate transfer belt 30 is stretched. The image forming devices 4Y, 4C, 4M, and 4K have a similar configuration except that the image firming devices 4Y, 4C, 4M, and 4K contain developers of different colors of yellow (Y), cyan (C), magenta (M), or black (K), respectively, corresponding to color separation components of a color image.

Specifically, each of the image forming devices 4Y, 4C, 4M, and 4K includes, for example, a drum-shaped photoconductor 5 as a latent-image bearer, a charger 6 that charges the photoconductor 5, a developing device 7 that supplies toner to the photoconductor 5, and a cleaning device 8 that cleans the photoconductor 5.

An exposure device 9 is disposed below the image forming devices 4Y, 4M, 4C, and 4K to expose circumferential surfaces of the photoconductors 5 with laser beams. The exposure device 9 includes, for example, a light source, a polygon mirror, an f-θ lens, and reflection mirrors, and irradiates the circumferential surfaces of the photoconductors 5 with laser beams Lb based on image data.

A transfer device 3 is disposed above the image forming devices 4Y, 4C, 4M, and 4K. The transfer device 3 includes an intermediate transfer belt 30 as a transferor, four primary transfer rollers 31 as primary transfer units, and a secondary transfer roller 36 as a secondary transfer unit. The transfer device 3 further includes a secondary transfer backup roller 32, a cleaning backup roller 33, a tension roller 34, and a belt cleaning device 35.

The intermediate transfer belt 30 is an endless belt and is stretched by the secondary transfer backup roller 32, the cleaning backup roller 33, and the tension roller 34. In the present embodiment, when the secondary transfer backup roller 32 is driven to rotate, the intermediate transfer belt 30 rotates in a direction indicated by arrow D1 in FIG. 1.

Further, density sensors 50, which are optical density sensors, are disposed at positions at which the intermediate transfer belt 30 can be measured. The density sensors 50 detect the density of a toner image formed on the surface of the intermediate transfer belt 30. The density sensors 50 are described in detail below.

Each of the four primary transfer rollers 31 sandwiches the intermediate transfer belt 30 together with corresponding one of the photoconductors 5 to form a primary transfer nip between the intermediate transfer belt 30 and the corresponding one of the photoconductors 5. The primary transfer rollers 31 are connected to a power supply located inside the image forming apparatus 1. The power supply applies a predetermined direct current (DC) voltage and/or a predetermined alternating current (AC) voltage to the primary transfer rollers 31.

The secondary transfer roller 36 and the secondary transfer backup roller 32 nip the intermediate transfer belt 30 to form a secondary transfer nip. Similar to the primary transfer rollers 31, the secondary transfer roller 36 is connected to the power supply located inside the image forming apparatus 1. The power supply applies at least one of a predetermined DC voltage and a predetermined AC voltage to the secondary transfer roller 36.

The belt cleaning device 35 includes a cleaning brush and a cleaning blade that contact an outer circumferential surface of the intermediate transfer belt 30. A bottle holder 2 disposed in an upper portion of the image forming apparatus 1 accommodates four toner bottles 2Y, 2C, 2M, and 2K detachably attached to the bottle holder 2. The toner bottles 2Y, 2C, 2M, and 2K contain fresh yellow, cyan, magenta, and black toner to be supplied to the developing devices 7 of the image forming devices 4Y, 4C, 4M, and 4K, respectively. Toner supply tubes are interposed between the toner bottles 2Y, 2C, 2M, and 2K and the respective developing devices 7. The fresh toner is supplied from the toner bottles 2Y, 2C, 2M, and 2K to the respective developing devices 7 through the toner supply tubes.

The image forming apparatus 1 includes a sheet feeding tray 10 that loads multiple sheets P serving as recording media and a sheet feeding roller 11 that picks up and feeds a sheet P from the sheet feeding tray 10 in a lower portion of the image forming apparatus 1. The sheet P as a recording medium may be, for example, thick paper, a postcard, an envelope, plain paper, thin paper, coated paper, art paper, tracing paper, or an overhead projector (OHP) transparency sheet. Optionally, the image forming apparatus 1 may include a bypass feeder that imports such recording media placed on a bypass tray into the housing of the image forming apparatus 1.

The image forming apparatus 1 includes a conveyance path R to convey a sheet P from the sheet feeding tray 10 to a sheet ejection roller pair 13 via the secondary transfer nip. The sheet ejection roller pair 13 ejects the sheet P outside the image forming apparatus 1. On the conveyance path R, a registration roller pair 12 as a conveyor to convey the sheet P to the secondary transfer nip is disposed upstream from the secondary transfer roller 36 in a sheet conveyance direction.

A fixing device 20 that fixes an unfixed toner image transferred to the sheet P is disposed downstream from the secondary transfer roller 36 in the sheet conveyance direction. On the conveyance path R, the sheet ejection roller pair 13 is disposed downstream from the fixing device 20 in the sheet conveyance direction. The sheet ejection roller pair 13 ejects the sheet P onto an output tray 14. The output tray 14 is disposed on a top surface of the image forming apparatus 1 to stack the sheets P ejected outside the image forming apparatus 1.

Referring to FIG. 1, a description is given of an image forming operation performed by the image forming apparatus 1 having the configuration described above to form a full-color toner image on a sheet P. When the image forming operation is started, the photoconductor 5 in each of the image forming devices 4Y, 4M, 4C, and 4K is driven to rotate clockwise in FIG. 1, and the charger 6 uniformly charges the surface of the photoconductor 5 in a predetermined polarity. The exposure device 9 emits the laser beams Lb onto the charged outer circumferential surfaces of the photoconductors 5. Thus, electrostatic latent images are formed on the photoconductors 5. The image data used to expose the photoconductors 5 is monochrome image data produced by decomposing a desired full color image into yellow, cyan, magenta, and black image data. The developing devices 7 supply yellow, cyan, magenta, and black toners to the electrostatic latent images formed on the photoconductors 5. Thus, the electrostatic latent images as yellow, cyan, magenta, and black toner images are visualized.

When the image forming operation is started, the secondary transfer backup roller 32 is also driven to rotate counterclockwise in FIG. 1. Thus, the intermediate transfer belt 30 is rotated in the direction indicated by arrow in FIG. 1. The power supply applies a constant voltage or constant current control voltage having a polarity opposite a polarity of the charged toner to the respective primary transfer rollers 31. Accordingly, a transfer electric field is generated at each of the primary transfer nips between the respective primary transfer rollers 31 and the respective photoconductors 5.

Subsequently, when the toner images of the yellow, cyan, magenta, and black color on the photoconductors 5 reach the respective primary transfer nips as the photoconductors 5 rotate, the toner images on the photoconductors 5 are sequentially transferred and superimposed onto the intermediate transfer belt 30 by the transfer electric fields formed at the primary transfer nips. Thus, a full-color toner image is borne on the surface of the intermediate transfer belt 30. The toner on each of the photoconductors 5 that has not been transferred to the intermediate transfer belt 30 is removed by corresponding one of the cleaning devices 8. Subsequently, static electricity of the outer circumferential surface of each of the photoconductors 5 is discharged, and thus the surface potential of the photoconductors 5 is initialized.

In the following description, the term “image hearer” includes the photoconductor 5 and the intermediate transfer belt 30. The term “image bearer” refers to a component or components having a function of bearing a toner image obtained by developing a latent image formed by an optical scanning system. For example, in the case of an image forming apparatus in which a toner image is transferred from a photoconductor to a printing object such as paper, the photoconductor itself corresponds to the image hearer. In the case of an image forming apparatus in which a toner image is transferred from a photoconductor to a printing object via a transfer belt, the photoconductor and the transfer belt correspond to the image bearer.

In the lower portion of the image forming apparatus 1, the sheet feeding roller 11 starts to rotate, and the sheet P is fed from the sheet feeding tray 10 onto the conveyance path R. The sheet P that has been fed onto the conveyance path R is sent to the secondary transfer nip between the secondary transfer roller 36 and the secondary transfer backup roller 32 at a timing determined by the registration roller pair 12. At this time, a transfer voltage having the polarity opposite to the toner charge polarity of the toner image on the intermediate transfer belt 30 is applied to the secondary transfer roller 36. Accordingly, a transfer electric field is formed at the secondary transfer nip.

Subsequently, when the toner images on the intermediate transfer belt 30 reach the secondary transfer nip along with the rotation of the intermediate transfer belt 30, the toner images on the intermediate transfer belt 30 are collectively transferred onto the sheet P by the transfer electric field formed at the secondary transfer nip. Residual toner on the intermediate transfer belt 30 that has not been transferred to the sheet P at this time is removed by the belt cleaning device 35, and the removed toner is conveyed to and collected in a waste toner container disposed in the body of the image forming apparatus 1.

Subsequently, the sheet P is conveyed to the fixing device 20, and the toner image on the sheet P is fixed to the sheet P by the fixing device 20. Then, the sheet P is ejected to the outside of the image forming apparatus 1 by the sheet ejection roller pair 13 and is stacked on the output tray 14.

The image forming operation for forming a full-color image on the sheet P has been described above. However, the image forming apparatus 1 can also form a single-color image using any one of the four image forming devices 4Y, 4C, 4M, or 4K, or form a two-color or three-color image using two or three of the four image forming devices 4Y, 4C, 4M, or 4K.

In the present embodiment, the configuration of the image forming apparatus 1 in FIG. 1 is described as an example. However, embodiments of the present disclosure are not limited to the image forming apparatus 1 having the above-described configuration. As an image forming apparatus, embodiments of the present disclosure may be applied to, for example, an image forming apparatus that directly transfers an image from a photoconductor to a printed material, an image forming apparatus that has only a single-color developing device, an image forming apparatus that uses two or three image forming devices to form a two-color or three-color image, or an image forming apparatus that has five or greater than developing devices.

Figure 2:
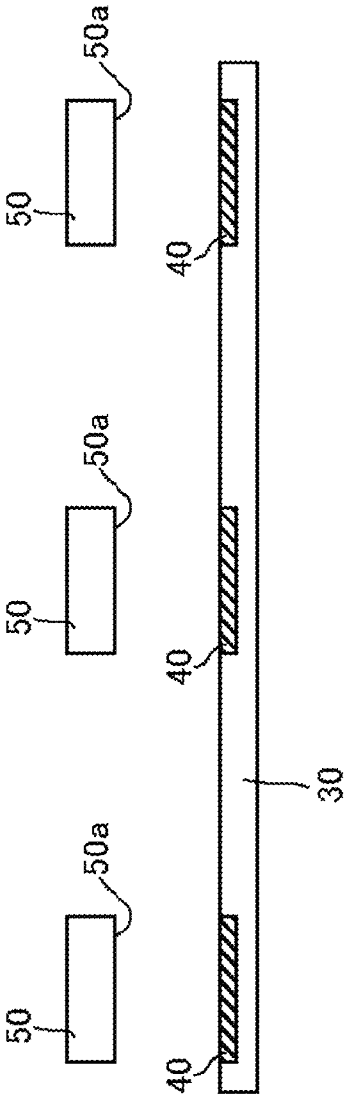
FIG. 2 is a schematic diagram illustrating a cross-section of an intermediate transfer belt and density sensors viewed from a direction indicated by an arrow A in FIG. 1, according to an embodiment of the present disclosure.

FIG. 2 is a schematic diagram illustrating a cross-section of the intermediate transfer belt 30 and the density sensors 50 viewed from the direction indicated by arrow A in FIG. 1. Each of the density sensors 50 includes a light emitter that emits detection light to a surface of the intermediate transfer belt 30 and a light-receiving surface 50*a* that optically reads and detects reflection light of the detection light reflected from a toner image on the surface of the intermediate transfer belt 30.

Patch portions 40 for density detection are formed on the surface of the intermediate transfer belt 30. The density sensors 50 detect the color densities of the patch portions 40, and the detection results are reflected in image forming conditions as correction control.

Note that areas in which the patch portions 40 are formed may be areas outside an area in which a typical toner image is formed on the intermediate transfer belt 30. In addition, the number of times in which the patch portions 40 are formed may be every predetermined number of times of image formation or every predetermined time from the start of image formation. A known configuration may be employed for the above-described image density control.

As can be viewed from FIG. 2 and FIG. 1, the density sensors 50 are disposed adjacent to the surface of the intermediate transfer belt 30. For this reason, when the surfaces of the density sensors 50, in particular, the light-receiving surfaces 50*a*, are dirty due to adhesion of foreign matter such as scattered toner, dust, or paper powder, the amount of light passing through the light-receiving surfaces 50*a* of the density sensors 50 may change. Accordingly, the density detection may not be performed at high accuracy.

In this regard, for example, a configuration is known in which a detection surface of a sensor is rubbed by a cleaner made of nonwoven fiber containing silicone oil. However, removing the dirt of the cleaner itself is not considered in such a configuration. Accordingly, the dirt of the sensor may not be removed over time after long-term use.

For this reason, in the present embodiment, a cleaning jig to clean the light-receiving surfaces 50*a* of the density sensors 50 is insertable into and removable from the body of the image forming apparatus 1. Accordingly, the cleaning jig can be easily cleaned or replaced. Thus, the light-receiving surfaces 50*a* of the density sensors 50 can be cleaned with the cleaning jig in clean condition.

Figure 3:
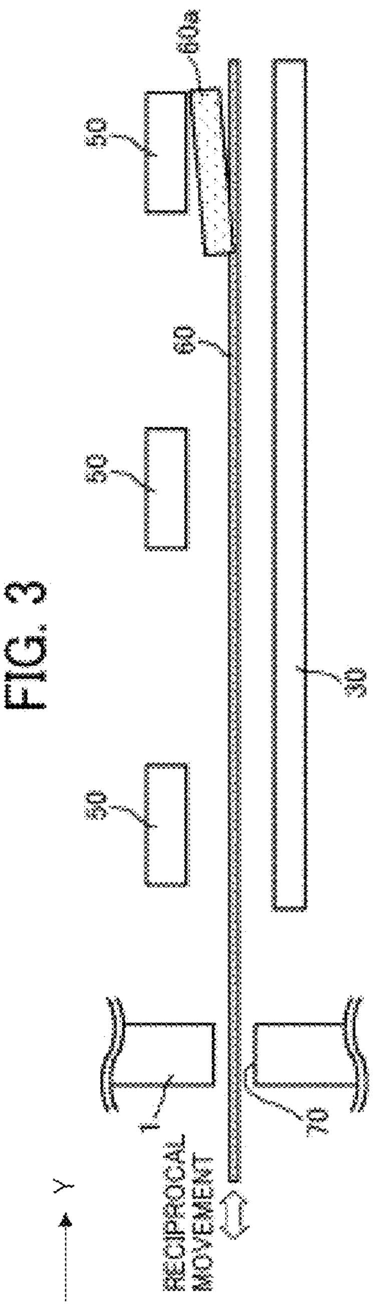
FIG. 3 is a schematic diagram illustrating a configuration of cleaning density sensors, according to an embodiment of the present disclosure.

FIG. 3 is a schematic diagram illustrating a configuration of cleaning the density sensors 50 according to an embodiment of the present disclosure. The image forming apparatus 1 according to the present embodiment includes a cleaning jig 60 to clean the light-receiving surface 50*a* of the density sensors 50, and an insertion port 70 through which the cleaning jig 60 is inserted into and removed from the body of the image forming apparatus 1. The density sensor 50 according to the present embodiment does not include a shutter as a shielding member to shield the light-receiving surface 50*a* from light, and the light-receiving surface 50*a* faces the surface of the intermediate transfer belt 30 constantly.

The cleaning jig 60 is, for example, a plate-shaped member. The cleaning jig 60 includes a cleaner 60*a* attached to one surface of the cleaning jig 60. The cleaner 60*a* contacts and cleans the light-receiving surfaces 50*a* of the density sensors 50. As the material of the cleaner 60*a*, for example, nonwoven fabric may be used.

The insertion port 70 is an opening disposed on a side surface of the image forming apparatus 1, and the cleaning jig 60 can be inserted into the body of the image forming apparatus 1 through the insertion 70. The cleaning jig 60 that has been inserted into the body of the image forming apparatus 1 is reciprocally moved along the intermediate transfer belt 30. By so doing, the cleaner 60*a* rubs the light-receiving surfaces 50*a* of the density sensors 50 to clean the light-receiving surfaces 50*a*.

After the cleaning of the light-receiving surfaces 50*a* is finished, the cleaning jig 60 is pulled out from the inside of the body of the image forming apparatus 1 and stored. At this time, the contaminated cleaner 60*a* can also be cleaned and/or replaced.

Note that, desirably, the insertion port 70 is provided with an openable and closable cover, and the openable and closable cover is opened when necessary, such as, for example, during cleaning.

As described above, the cleaning jig 60 is insertable into and removable from the body of the image forming apparatus 1. Accordingly, the cleaning jig 60 and the cleaner 60*a* can be easily cleaned or replaced. Accordingly, the cleaning performance of the cleaner 60*a* can be maintained at or above a certain level.

Modification

Figure 4:
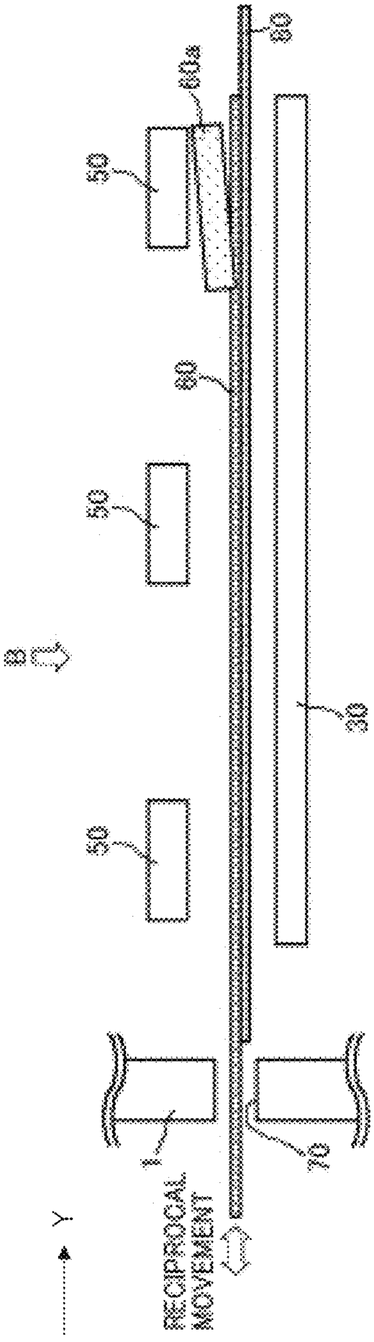
FIG. 4 is a schematic diagram illustrating a configuration of cleaning density sensors, according to a modification of the embodiment of FIG. 3.

FIG. 4 is a schematic diagram illustrating a configuration of cleaning the density sensors 50, according to a modification of the embodiment of FIG. 3. The image forming apparatus 1 according to the present modification includes a guide 80 disposed between the intermediate transfer belt 30 and the density sensors 50.

Figure 5:
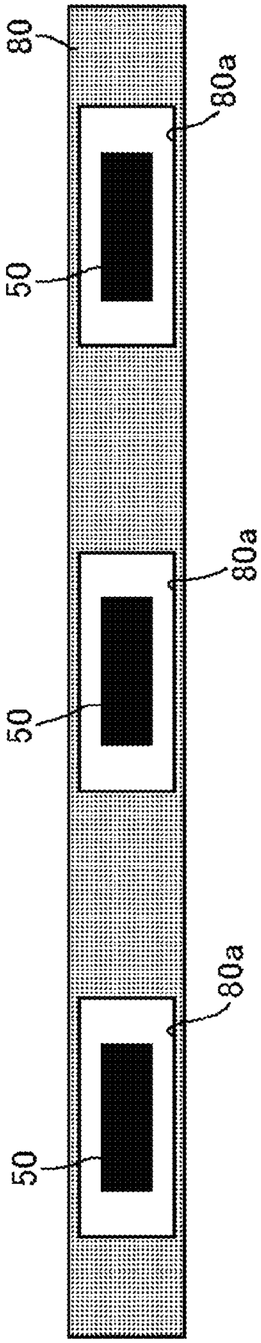
FIG. 5 is a schematic plan view of density sensors and a guide as viewed in a direction indicated by an arrow B in FIG. 4, according to an embodiment of the present disclosure.

The guide 80 is parallel to the light-receiving surfaces 50*a* of the density sensors 50. As illustrated in FIG. 5, at least each of portions, i.e., openings 80*a*, of the guide 80 facing the respective light-receiving surfaces 50*a* is opened.

In the present modification, the cleaning jig 60 is placed on the guide 80, and reciprocal movement of the cleaning jig 60 is guided by the guide 80. Accordingly, the light-receiving surfaces 50*a* of the density sensors 50 can be cleaned stably and easily.

The above-described guide 80 may have a plate shape or a wire shape. However, in any of cases in which the guide 80 has the plate shape or the wire shape, at least a portion of the guide 80 that faces each of the light-receiving surfaces 50*a* is opened.

When the light-receiving surfaces 50*a* of the density sensors 50 are charged, dirt is likely to adhere to the light-receiving surfaces 50*a*. For this reason, desirably, liquid, e.g., distilled water, having a property of preventing the light-receiving surfaces 50*a* from being charged is applied to portions of the cleaner 60*a* and the light-receiving surfaces 50*a* that contact each other. In this case, cleaning can be performed while preventing the density sensor 50 and the light-receiving surface 50*a* from being charged, which is advantageous.

Embodiments of the present disclosure have been described in detail above. The above-described embodiments are examples and can be modified in various manners without departing from the scope of the disclosure. For example, the embodiments and the modification may be implemented in combination.

Alternatively, the light-receiving surfaces 50*a* of the density sensors 50 may be arranged to constantly face the respective photoconductors 5 such that the densities of the patch portions 40 formed on the surfaces of the photoconductors 5 are detected. In such a case, the light-receiving surfaces 50*a* of the density sensors 50 can also be cleaned by the configuration including, for example, the insertion port disposed in the body of the image forming apparatus and the cleaning jig as described in the above-described embodiments.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. An image forming apparatus comprising:

an image forming device to form a toner image;

an image bearer, which is a belt, to bear the toner image to be transferred on a recording medium;

at least one density sensor having a light-receiving surface to optically read the toner image, the light-receiving surface facing the image bearer constantly;

a cleaning jig to clean the density sensor, the cleaning jig including a cleaner to contact the light-receiving surface; and an insertion port through which the cleaning jig is inserted into a body of the image forming apparatus and reciprocally moved to clean the light-receiving surface and is to be removed from the body of the image forming apparatus after the light-receiving surface is cleaned, wherein the cleaning jig is removed from an inside of the body of the image forming apparatus after cleaning of the light-receiving surface is finished.

2. The image forming apparatus according to claim 1, further comprising:

a guide between the image bearer and the density sensor, wherein the guide has an opening at at least a portion facing the light-receiving surface of the density sensor, and the guide is to guide reciprocal movement of the cleaning jig.

3. The image forming apparatus according to claim 2, wherein the guide is parallel to the light-receiving surface of the density sensor.

4. The image forming apparatus according to claim 2, wherein the guide has a plate shape.

5. The image forming apparatus according to claim 1, wherein a portion at which the cleaner and the light-receiving surface contact each other includes a liquid that prevents the light-receiving surface from being charged, to clean the light-receiving surface.

6. The image forming apparatus according to claim 5, wherein the liquid includes distilled water.

7. The image forming apparatus according to claim 1, further comprising a housing configured to house the image forming device, the image bearer, and the at least one density sensor.

8. The image forming apparatus according to claim 7, wherein the insertion port is disposed on a side of the housing, and the cleaning jig is removed from the inside of the body of the image forming apparatus after cleaning of the light-receiving surface is finished though the insertion port on the side of the housing.

9. The image forming apparatus according to claim 1, wherein the cleaner is formed of a nonwoven fabric.

10. The image forming apparatus according to claim 1, further comprising:

a cover to cover the insertion port.

11. The image forming apparatus according to claim 1, wherein the at least one density sensor does not include a shutter that shields the light-receiving surface from light.

* * * * *